United States Patent [19]

Kim et al.

[11] Patent Number: 5,711,788
[45] Date of Patent: Jan. 27, 1998

[54] DUST NEUTRALIZING AND FLOCULATING SYSTEM

[75] Inventors: Yong Jin Kim, Dae Jeon; Won Suk Hong, Seoul; Han Geel Yeom; Jae Ouk Lee, both of Dae Jeon; Yong Seung Moon, Ansan; Won Huy Lee, Souwon; Chan Yeol Lee, Goun San; Jung Ho Kim, Ansan, all of Rep. of Korea

[73] Assignee: Cambridge Filter Korea, Ltd., Ansan, Rep. of Korea

[21] Appl. No.: 625,803

[22] Filed: Mar. 28, 1996

[30] Foreign Application Priority Data

Mar. 30, 1995 [KR] Rep. of Korea .................. 95-6973

[51] Int. Cl.⁶ ............................................. B03C 3/66
[52] U.S. Cl. ................... 96/3; 96/57; 96/75; 96/80; 361/226
[58] Field of Search ..................... 96/57, 58, 75, 96/80, 95, 97, 1, 3; 95/69, 7; 361/226

[56] References Cited

U.S. PATENT DOCUMENTS 3,892,544  7/1975  Haupt ........................................... 361/226
5,061,296  10/1991  Sengpiel et al. ................................ 95/7

Primary Examiner—Richard L. Chiesa
Attorney, Agent, or Firm—Quarles & Brady

[57] ABSTRACT

A dust neutralizing and flocculating system used in an air cleaning system for removing contaminants contained in indoor air including a radio frequency generating electrode and an ion generating electrode. Fine particles passing through a moderately efficient filter equipped in the air cleaning system sequentially pass through the radio frequency generating electrode and ion generating electrode. The fine particles are dipolarly magnetized while passing through the radio frequency generating electrode, thereby exhibiting an increased inter-particles attraction. The ion generating electrode adds cations and anions to the fine particles, thereby promoting the flocculation of the fine particles circulating in the room installed with the air cleaning system. By virtue of the promoted flocculations, the particle size of the particles circulating in the room increases. The particles with an increased size are secondarily removed by the filter.

8 Claims, 3 Drawing Sheets

5,711,788

DUST NEUTRALIZING AND FLOCULATING SYSTEM

FIELD OF THE INVENTION

1. Field of the Invention

The present invention relates to a dust neutralizing and flocculating system used in air cleaning systems for removing contaminant contained in the room air.

2. Description of the Prior Art

Recently, the interest in the contaminants existing in rooms or other dwelling spaces, in particular, in underground dwelling spaces has increased. To this end, the use of air cleaning system in buildings and industrial fields have increased continuously.

Typically, particles to be collected in indoor spaces have phases of solid, liquid or a mixture thereof. Such particles also have diameters widely ranging from submicrons to several ten microns. Among such particles which are called aerosol, those relating to a combination of indoor spaces include submicron particles such as dust contained in the atmosphere and cigarette smoke.

The contamination of indoor spaces results from human actions in indoor spaces. Contaminants contained in such indoor spaces include particles with a size of 1 μm or below in a percentage of, at least 99%, as reported by ASHRAE's report. It is difficult to remove such particles by highly efficient filters as well as moderately efficient filters. Such parties ere known as being always suspended in the air without falling down due to gravity.

In accordance with the increased use of air cleaners and the increased interest in the indoor environment, active research has been made to maximize the efficiency of air cleaners for collecting submicron particles. Recently, an electrical systems, which include electrical, electronic or electrostatic types, have been incorporated in conventional mechanical filters to control fine particles. Such electrical systems are adapted to not only effectively remove particles with a size of 1 μm or below, but also effectively remove micro particles with a size ranging from 0.1 μm to 0.01 μm. However, the conventional filters have a construction disabling the removal of micro particles with a size of 0.1 μm or below. Although electrical filters enable the removal of micro particles with a size of 0.1 μm or below, they involve an occurrence of ozone due to the discharge of corona caused by a high DC voltage.

Generally, the neutralization and flocculation of dust means that particles contained in the air are charged with electricity to couple with neutralized particles, thereby causing them to be dipolefly polarized. This principle should be taken into consideration the coulomb force of the particles.

Where particles charged with positive electricity and uncharged particles exist together in a confined space, the charged particles come close to the uncharged particles and attract anions of the uncharged particles. As a result, the uncharged particles are gathered toward the charge particles, thereby forming dipoles. Such particles exhibit a high reactivity. By virtue of such a high reactivity, the force of the particles to couple with particles existing in the air increases.

In accordance with this principle, the flocculation of dust is achieved. Accordingly, it is possible to collect uncharged or weakly charged particles existing in an indoor electric field. U.S. Pat. No. 5,061,296 discloses an air cleaning system using a high DC voltage with a single pole and radio frequency ranging from 150 KHz to 200 KHz. However, this system has the drawback that it requires a high DC voltage source for generating a DC voltage higher than 15 KV and a radio frequency generator.

SUMMARY OF THE INVENTION

Therefore, an object of the invention is to provide a dust neutralizing and flocculating system including an ion generating electrode and a radio frequency generating electrode, thereby being capable of reducing the voltage drop of a voltage generator used in the systme and the frequency used in the system.

In accordance with the present invention, this object is accomplished by providing in an air cleaning system including a clean room, an air flow passage provided at an upper portion of the clean room and adapted to flow air to be cleaned, and a moderately efficient filter arranged in the air flow passage, a dust neutralizing and flocculating system, which is arranged downstream of the moderately efficient filter in the air flow passage, comprising: a radio frequency generating electrode for dipolarly magnetizing fine particles entrained in the air emerging from the filter; an ion generaitng electrode for adding cations and anions to the dipolarly magnetized fine particles, thereby promoting a flocculation of the fine particles; and a voltage generator for generating a controlled voltage to be applied to the ion generating electrode.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
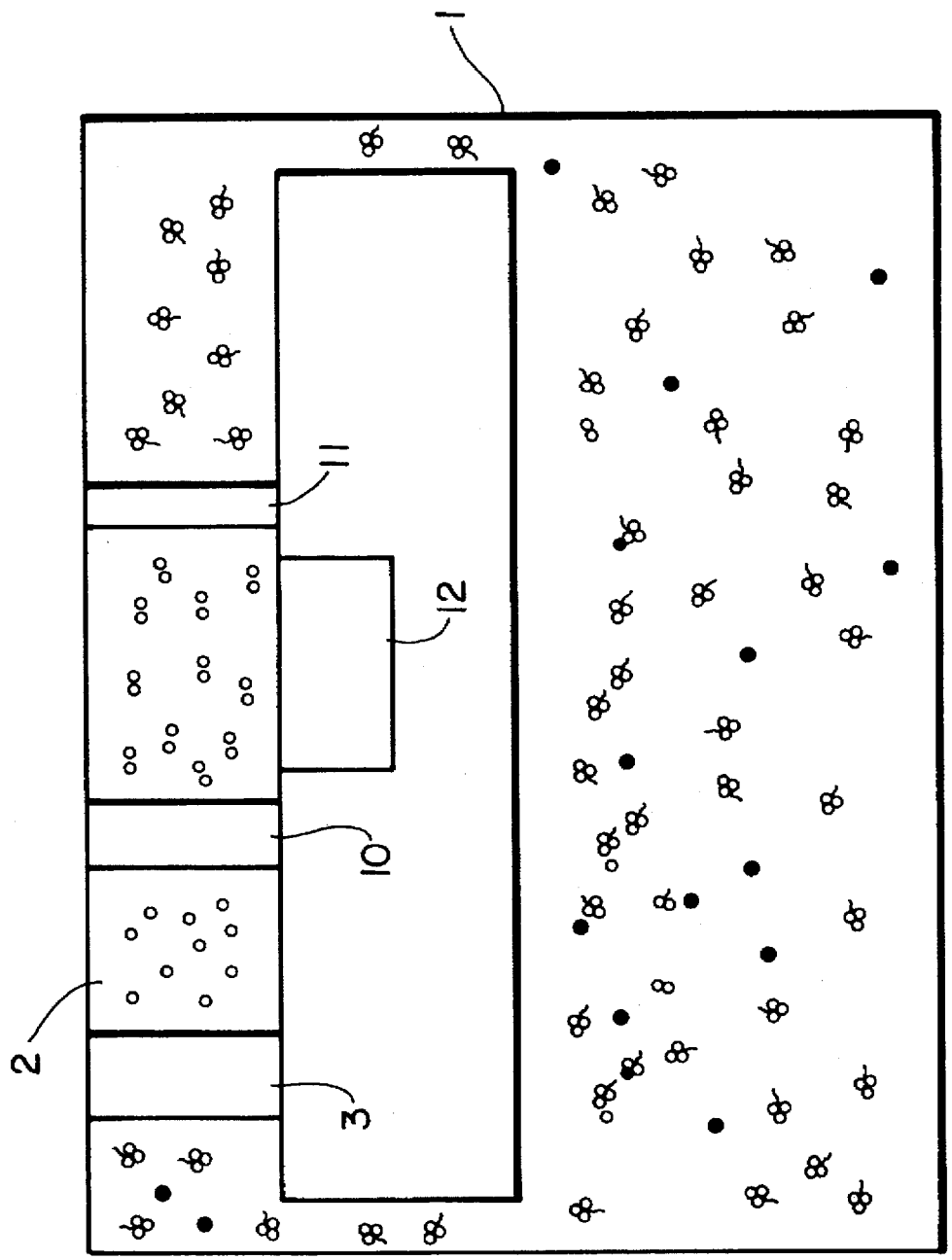
FIG. 1 is a schematic view illustrating an air cleaning system in which a neutralizing and flocculating system according to the present invention is used.

Referring to FIG. 1, an air cleaning system is shown, which is equipped with a dust neutralizing and flocculating systm according to the present invention. As shown in FIG. 1, the air cleaning system includes a clean room 1 provided with air flow passages 2 at the upper portion thereof. A moderately efficient filter 3 is arranged in the air flow passage 2.

The dust neutralizing and flocculating system according to the present invention is arranged downstream of the moderately efficient filter 3 in the air flow passage 2. This dust neutralizing and flocculating system includes a radio frequency generating electrode 10, an ion generating electrode 11 and a voltage generator 12.

Figure 3:
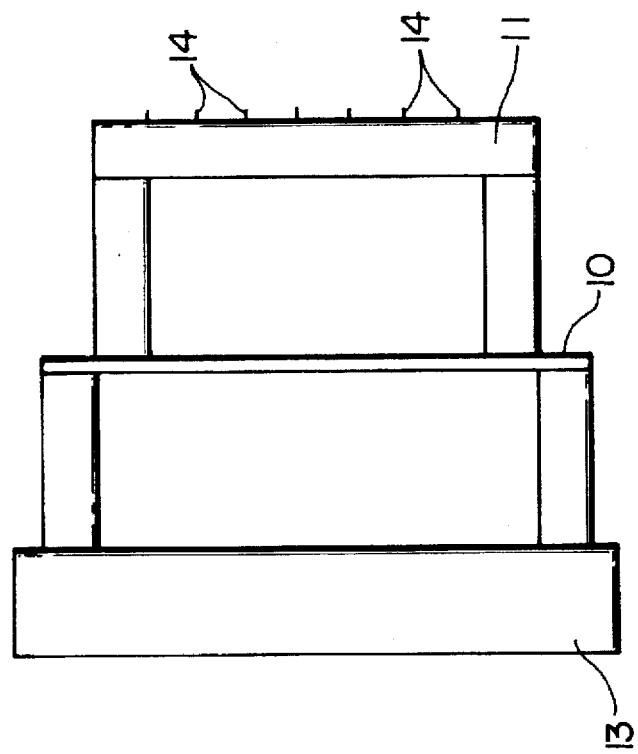
FIG. 3 is a side view of the neutralizing and flocculating system according to the preset invention.
Figure 2:
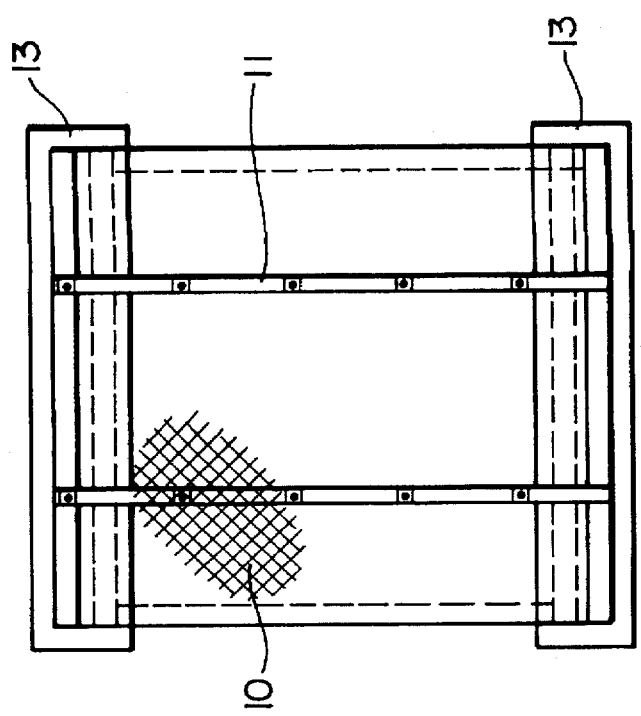
FIG. 2 is a front view of the neutralizing and system according to the present invention.
Figure 5:
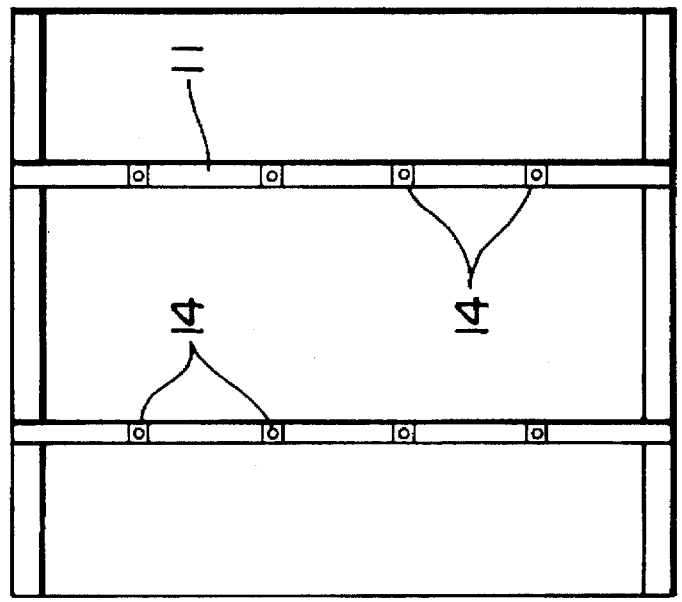
FIG. 5 is a front view illustrating an ion generating electrode according to the present invention.

In FIGS. 2 and 3, the detailed construction of the dust neutralizing and flocculating system according to the present invention is shown. As shown in FIGS. 2 and 3, the radio frequent generating electrode 10 and ion generating electrode 11 are fixedly mounted to a support member 13 such that they are parallel to each other.

Figure 4:
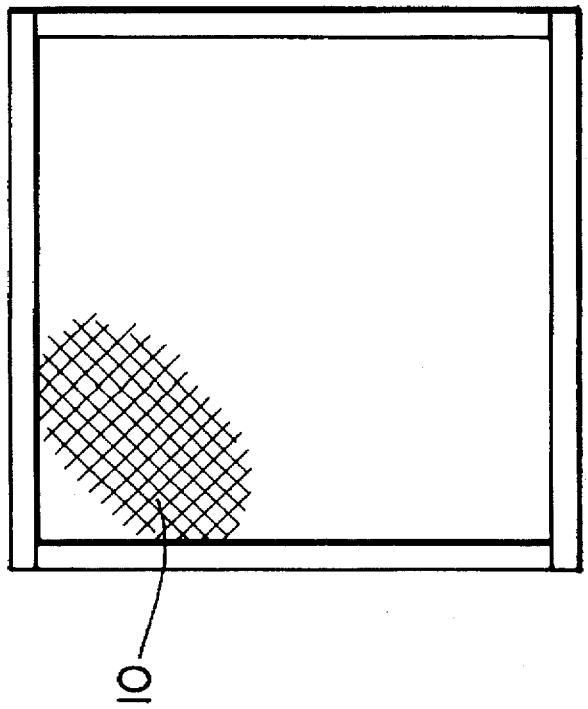
FIG. 4 is a front view illustrating a radio frequency electrode according to the present invention.

As shown in FIG. 4, the radio frequency generating electrode 10 has a mesh shape whereas the ion generating electrode 11 has a bar shape provided with a plurality of ion generating portions 14. The radio frequency generating electrode 10 is connected to a radio frequency generator which may be available from Korea Switching Company, Limited or Taewha Electric Company, Limited. The radio frequency generator may generate a voltage of 1,000 V with a frequency ranging from 5 KHz to 20 KHz. The ion generating electrode 11 serves to generate charged ions for removing dust, contaminants and static electricity. The ozone generating rate of the ion generating electrode 11 is less than 0.1 ppm.

The voltage generator 12, which is connected to the ion generating electrode 11, is available from Sinhan Industry Company, Limited. The voltage generator 12 may generate a voltage ranging from ±5 KV to 15 KV.

In the dust neutralizing and flocculating system according to the present invention, the moderately efficient filter 3 primarily filters the contaminated room air to remove articles with a large particle size from air in a room equipped with the system of the present invention. Fine particles passing through the filter 3 then sequentially pass through the radio frequency generating electrode 10 and ion generating electrode 11. The fine particles are dipolarly magnetized while passing through the radio frequency generating electrode 10, thereby exhibiting an increased inter-particle attraction. On the other hand, the ion generating electrode 11 adds cations and anions to the fine particles, thereby promoting the flocculation of the fine particles circulating in the room. By virtue of the promoted flocculation, the particle size of the particles circulating in the room increases. As a result, the particles with an increased size can be secondarily removed b the moderately efficient filter 3. Thus, the dust contained in the room air can be efficiently removed.

In order to evaluate the effect of the dust neutralizing end flocculating system according to the present invention as compared to the conventional system, a flocculation test was made for cigarette smoke under the condition that both systems have no filter. As a result of the test, it was found that after 150 had elapsed, the number of particles with a size of at least 0.3 µm was 78% of the number of all particles at the initial state of the testing in the case of the conventional and 94% in the case of the present system. Accordingly, the system of the present invention exhibits a flocculation rate better than that of the conventional system. Another fast was also carried out for the removal rate of cigarette smoke under the condition that a 95% filter was installed. As a result of the test, it was found that after 5 minutes had elapsed, 58% of the number of 1 µm particles at the initial state of the testing was removed in the case of the conventional system. On the other hand, the preset system exhibited an improved removal rate of 70%.

As apparent from the above description, the present invention provides a dust neutralizing and flocculating system including an ion generating electrode and a radio frequency generating electrode, thereby being capable of achieving an improvement in the removal rate of contaminants. In accordance with the present invention, the ion generating electrode can generate a voltage controlled in the range of 5 KV to 15 KV, thereby controlling the amount of ions generated. In accordance with the present invention, it is also possible to reduce the voltage drop of a voltage generator used in the system the frequency used in the system. Accordingly, there is an economical effect.

Although the preferred embodiments of the invention have been disclosed for illustrative purposes, those skilled in the art will appreciate that various modifications, additions and substitutions are possible, without departing from the scope and spirit of the invention is disclosed in the accompanying claims.

What is claimed is:

1. In an air cleaning system including a clean room, an air flow passage provided at an upper portion of the clean room and adapted to flow air for cleaning, and a moderately efficient filter arranged in the air flow passage, a dust neutralizing and flocculating system, which is arranged downstream of the moderately efficient filter in the air flow passage, said system comprising:

a radio frequency generating electrode for dipolarly magnetizing fine particles entrained in the air emerging from the filter;

an ion generating electrode for adding cations and anions to the dipolarity magnetized fine particles, thereby promoting a flocculation of the fine particles; and, a voltage generator for generating a controlled voltage to be applied to the ion generating electrode.

2. The system of claim 1, wherein said radio frequency generating electrode generates a signal in a range of approximately 5 kHz to 20 kHz.

3. The system of claim 1, wherein said voltage generator is a bipolar voltage generator.

4. The system of claim 1, wherein said controlled voltage is in a range of approximately ±5 kV to 15 kV.

5. The system of claim 1, wherein:

said radio frequency generating electrode generates a signal in a range of approximately 5 kHz to 20 kHz; and, said voltage generator is a bipolar voltage generator.

6. The system of claim 1, wherein:

said radio frequency generating electrode generates a signal in a range of approximately 5 kHz to 20 kHz; and, said controlled voltage is in a range of approximately ±5 kV to 15 kV.

7. The system of claim 1, wherein:

said voltage generator is a bipolar voltage generator; and, said controlled voltage is in a range of approximately ±5 kV to 15 kV.

8. In an air cleaning system including a clean room, an air flow passage provided at an upper portion of the clean room and adapted to flow air for cleaning, and a moderately efficient filter arranged in the air flow passage, a dust neutralizing and flocculating system, which is arranged downstream of the moderately efficient filter in the air flow passage, comprising:

a radio frequency generating electrode, generating a signal in a range of approximately 5 kHz to 20 kHz, for dipolarly magnetizing fine particles entrained in the air emerging from the filter;

an ion generating electrode for adding cations and anions to the dipolarly magnetized fine particles, thereby promoting a flocculation of the fine particles; and, a bipolar voltage generator for generating a controlled voltage in a range of approximately ±5 kV to 15 kV to be applied to the ion generating electrode.

* * * * *